Patented Nov. 14, 1950

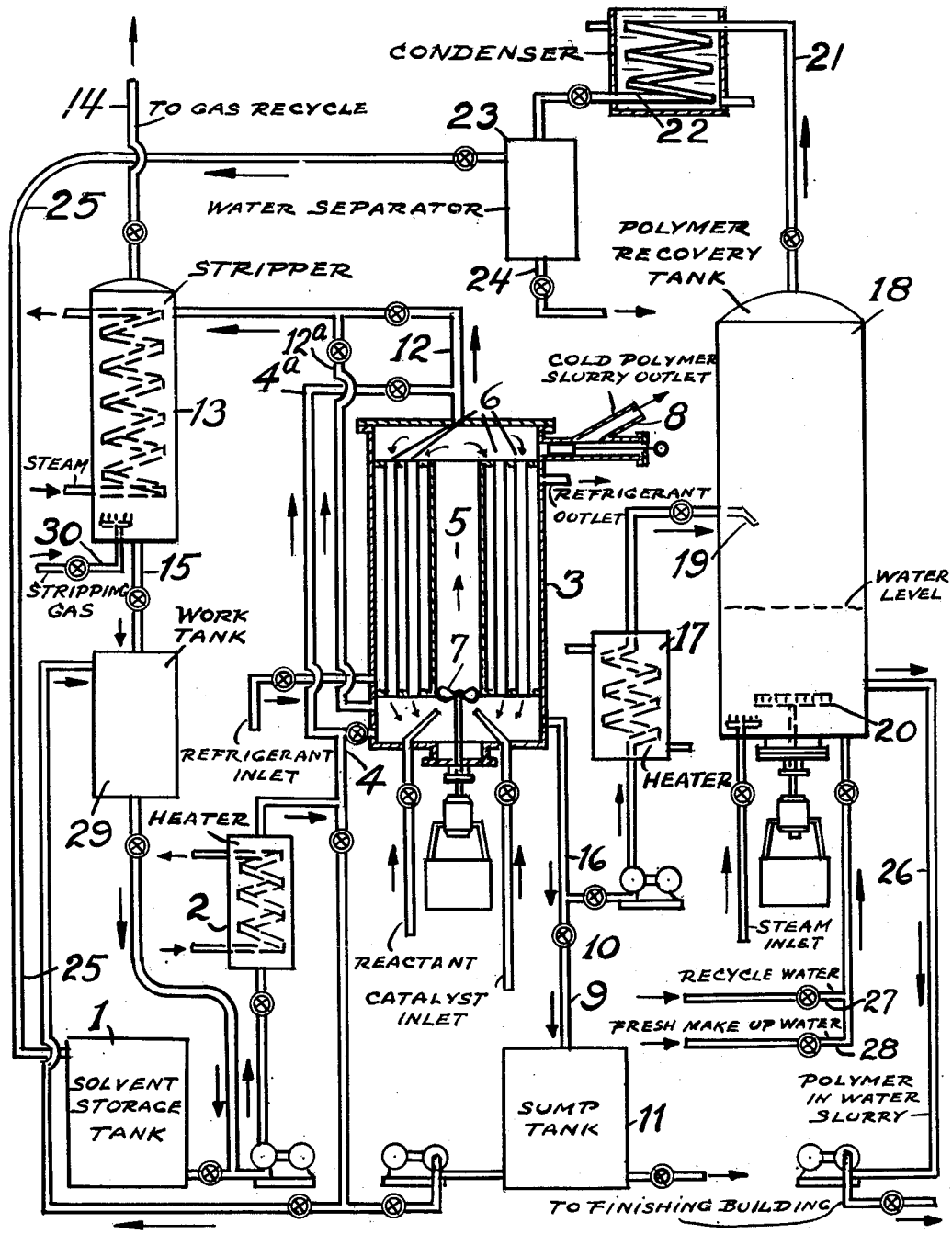

2,530,144

UNITED STATES PATENT OFFICE 2,530,144

CLEANSING OF POLYMERIZATION REACTORS

John H. Bannon, Union, N. J., assignor to Standard Oil Development Company, a corporation of Delaware Application December 29, 1944, Serial No. 570,449

8 Claims. (Cl. 260—85.3)

The present invention relates to the production of polymers and particularly to the production of high molecular weight polymers from isoolefins or mixtures of isoolefins and diolefins at low temperatures and in the presence of Friedel-Crafts type catalysts.

High molecular weight polymers having a molecular weight as determined by the Staudinger method of from about 15,000 to 25,000 up to 200,000 to 300,000 or more have been obtained by polymerizing isoolefins, such as isobutylene, by contact with a Friedel-Crafts type catalyst at temperatures below −10° C. Relatively recently copolymers which are curable with sulfur have been obtained by treating mixtures of an isoolefin such as isobutylene and a diolefin such as butadiene or isoprene with a solution of a Friedel-Crafts type catalyst in a non-complex-forming, low-freezing solvent such as methyl or ethyl chloride, carbon disulfide and the like and at temperatures ranging from −10° C. to −160° C., preferably at temperatures between −40° C. and −103° C. (i. e., between about −40° F. and −153.4° F.).

It has been found advantageous to carry out these reactions in reactors provided with suitable heat exchange surfaces and means for maintaining the reactants well agitated. A major difficulty encountered in the operation of these processes has been the fact that the reactor circulatory system and the cooling or heat exchange surfaces become fouled with deposited polymer. This is highly objectionable since it not only reduces the heat transfer coefficient of the reactor but it also interferes with the circulation of the reaction mixture eventually plugging all or a substantial part of the reactor at which time the polymerization must be stopped to remove these deposits. Removal of the deposits by hand is difficult and at times impossible. Moreover, as ordinarily conducted the cleaning results in substantial losses of reactants, diluents, polymer and the like.

It is the object of this invention to provide the art with a method whereby reactors used for the preparation of high molecular weight, low temperature polymers of isoolefins and copolymers of isoolefins and diolefins may be thoroughly cleaned in a facile manner.

It is also the object of this invention to provide the art with a method whereby said reactors may be thoroughly cleaned without loss of reactants, diluents and/or polymer.

These and other objects will appear more clearly from the specification and claims which follow.

It has now been found that reactors used for the preparation of high molecular weight low temperature polymers of isoolefins or of mixtures of isoolefins with modifying copolymerizable materials such as styrenes or diolefins can be advantageously cleaned by running a suitable solvent such as a straight run naphtha into the reactor while the latter is still filled with residual cold reaction mixture to dissolve the polymer deposits. In order to expedite the dissolution of the polymer deposit, the cleaning solvent at moderately warm temperatures of 100 to 150° F. is usually circulated through the reactor. The solvent leaving the reactor is preferably subjected to a stripping operation to remove unreacted materials and diluents which are generally somewhat more volatile than the solvents used. When the reactor is freed from deposited polymer, the solvent is drained from the reactor and the latter is then rinsed with fresh solvent to remove the last traces of polymer-containing solvent. Although the solvent may be used on a once-through basis, it is ordinarily preferred to recirculate the stripped solvent until it contains about 5 weight per cent of polymer whereupon it may be treated for recovery of the polymer or used for fuel purposes.

Apparatus suitable for the conduct of the present process is illustrated in the accompanying drawing, wherein the single figure shows a flow plan in accordance with the present invention.

In the drawing 1 is a solvent storage or work tank holding a supply of suitable solvent which is pumped through heater 2 and supplied to reactor 3 through line 4. The reactor 3 is of the type shown in my copending application Serial No. 448,575, filed June 26, 1942 and now abandoned, and comprises a central draft tube 5, a plurality of return tubes 6 all surrounded by a refrigerant jacket through which a suitable refrigerant such as liquid ethylene is circulated during the ordinary conduct of the polymerization reaction. A motor-driven agitator 7 is arranged at the bottom of the central draft tube for imparting the necessary agitation to the contents of the reactor. Inlets for reactants and catalyst are provided adjacent the agitator in order that both may be introduced into the reactor at a point of maximum turbulence and an overflow 8 is provided for the discharge of polymer slurry in cold reaction mixture. A line 9 controlled by a valve 10 is arranged at the bottom of the reactor for draining the contents into sump tank 11 or the like when it is desired to dump the contents of the reactor. A discharge pipe 12 is provided at the top of the reactor for withdrawing solvent from the reactor and supplying it to stripper 13 wherein it is heated by steam or other heating agent sufficiently to drive off the volatiles such as isoolefins, diolefins, diluents, catalyst solvents and the like removed from the reactor. The volatile materials driven off in the stripper are withdrawn through line 14 and added to the gas recycle stream and passed to suitable recovery equipment. The stripped solvent is withdrawn from stripper 13 and passed through line 15 into the work tank 29 from which it is withdrawn and recirculated back through the heater and reactor to effect further cleaning thereof.

Instead of operating with upward flow of the solvent it is also possible to operate with downward flow by closing the valve in line 4, opening the valve in line 4a and opening the line 12a to permit withdrawal of the solvent from the bottom of the reactor and the transfer of the solution to stripper 13 as shown.

A line 16 and pump are also provided at the bottom of the reactor for withdrawing the contents of the reactor 3 and supplying it to the heater 17 and thence to the polymer recovery tank. This line may be used not only for emptying the reactor but also for withdrawing the solvent from the reactor when operating on a oncethrough basis with downward flow of the solvent.

When the solvent contains about 5 weight per cent of polymer it is usually advisable to free it from polymer. In this case the polymer-containing solvent is sent through line 16 and heater 17 into the polymer recovery tank 18. In order to facilitate the separation of the polymer from the solvent the stream is preferably discharged into the tank through nozzles 19 which serve to subdivide the stream into relatively small droplets. A relatively large body of heated water is maintained in the bottom of the polymer recovery tank and a motor driven agitator 20 is provided to keep the polymer in finely divided form as a slurry in water. In order to facilitate dispersion, a substance such as zinc stearate or other dispersing agent may be added to the water. Steam is introduced into the water to drive off the solvent which is taken overhead through line 21, passed through a condenser 22 and discharged into a water separator 23 wherein the water and solvent are permitted to separate into layers, the water being withdrawn at 24, the solvent passing through line 25 to the solvent storage 1.

The slurry of polymer in water is withdrawn from tank 18 and is pumped through line 26 to the polymer finishing building where it is separated from the water, dried and packaged or compounded and used. The water separated from the slurry may be recycled to the recovery tank through line 27 while fresh make-up water is supplied through line 28.

Instead of recycling the solvent through the reactor a number of times, in order to build up the concentration of polymer to a substantial extent, the solvent may be discharged from the stripper 13 directly into the polymer recovery tank 18, or, if desired, the stripper could be omitted and the solvent leaving the reactor passed through a heater and then discharged into the polymer recovery tank. In the latter event, the products taken overhead from tank 18 would be passed into suitable fractionation and recovery equipment wherein the unreacted isoolefin and/or diolefin, diluent and catalyst solvent as well as polymer solvent can be recovered for reuse in the process.

A typical cleaning cycle is carried out in the following manner:

The supply of reactants such as isobutylene and isoprene in methyl chloride diluent and catalyst such as aluminum chloride dissolved in methyl chloride to the reactor and refrigerant such as liquefied ethylene to the cooling jacket are stopped and the overflow 8 is closed. Alternatively, the flow of catalyst to the reactor may first be stopped and the greatest part of the polymer suspended in the reactor removed through the overflow by continuing the introduction of reactants, thus flushing out the loose polymer. Refrigeration may be cut off during this period to hasten warming up the reactor. Solvent is withdrawn from the storage tank, heated to a temperature of about 150° F. and charged to the reactor containing the residual reaction mixture. When the reactor is filled, the mixture overflows to stripping drum 13 where heat is applied to remove any unreacted isobutylene or isoprene and methyl chloride which had been mechanically retained by the polymer deposited on the reactor walls and dissolved by the solvent. Instead of heating the solvent indirectly, the stripper may be so constructed that steam or other heated vapor or stripping gas may be introduced directly into the solvent as through line 30 in order to vaporize the volatile materials. The removed volatiles are passed into the ordinary recycle purification stream for recovery of the isobutylene, isoprene and methyl chloride. The stripped solvent is then run into the work tank 29 and is recirculated by a pump back to the reactor. An additional line 4a providing for circulation of hot solvent directly from heater 2 to line 12 may advantageously be provided to prevent polymer from clogging transfer lines 12 and 15, and stripper 13. In order to facilitate the dissolving process, the circulating pump of the reactor is put into operation to give a high velocity of flow of solvent through the circulatory system. After completion of the cleaning, the reactor is drained and rinsed with fresh solvent to remove the last traces of polymer.

The solvent may be used until it contains about 4 to 5 weight per cent of dissolved polymer. The spent solvent is then passed to the polymer recovery equipment as by passing it through line 16 and heater 17 into the recovery tank 18. The polymer solution is heated in heater 17 to a temperature above the boiling point of the solvent and upon spraying the heated solution through nozzles 19 into tank 18 the solvent flashes into vapor. Any solvent carried down into the water in the tank is removed by passing live steam into the water. The solvent vapors and steam are taken overhead through line 21 condensed and passed to separator 23 wherein the water is removed by settling and decanting whereupon the solvent may be returned to solvent storage.

An anti-tack or anti-agglomerating agent such as zinc stearate, (2% on polymer) and a surface active agent such as an alkylated naphthalene sulfonate or a high molecular weight aliphatic or olefinic sulfonate or sulfate such as the sodium salt of tri- or tetraisobutenyl sulfonic acid, sodium lauryl sulfate or the like is added to the water in the recovery tank in order that the polymer may be maintained in a finely divided form. The agitator in the polymer recovery tank maintains a good dispersion of the polymer in water. The slurry of polymer in water is withdrawn from the recovery tank and is pumped to the polymer finishing system wherein it is recovered separately or blended with the regular polymer product.

Thus it will be seen that, in lieu of draining the contents of the reactor into the sump tank it is preferable according to the present invention to displace the contents of the reactor with heated solvent since the unreacted olefinic materials, diluent, etc. are readily stripped from the effluent from the reactor and introduced into the recycle recovery system thereby avoiding any loss of these valuable materials.

The process of this invention may be applied to clean reactors used for the preparation of any solid, high molecular weight low temperature polymerizates from isoolefinic materials alone or from mixtures of isoolefinic materials with a number of materials capable of copolymerizing with isoolefins such as diolefins and vinyl aromatic compounds such as styrene, alpha methyl styrene and the like. The preferred isoolefin is isobutylene but other isoolefins containing up to about 8 carbon atoms per molecule may be used. The copolymerizable diolefinic materials include butadiene and substituted butadienes, especially isoprene, piperylene and dimethylbutadiene. Other polyolefinic materials containing up to 12 or 14 carbon atoms per molecule such as myrcene and certain non conjugated diolefins such as dimethylallene and the like are also useful. The ratio of isoolefin to diolefin in the liquid is from about 50 to 99 weight per cent of isoolefin to about 50 to 1 weight per cent of diolefin. With $C_5$ and higher diolefins the amount of diolefin is less than 10 weight per cent and preferably less than 5 weight per cent.

The olefinic materials are preferably cooled to temperatures below about $-40°$ C. and polymerized by the addition of a Friedel-Crafts type catalyst dissolved in a low-freezing, non-complex-forming solvent such as methyl-, ethyl- or propyl-mono or polyhalides or carbon disulfide, or the like. The reactants, catalysts, solvents and the like and the general properties of the polymers formed are described in detail in U. S. Patent No. 2,203,873, dated June 11, 1940, and in Australian Patent No. 112,875, issued July 31, 1941.

The solvents which are used in accordance with the present invention are preferably materials which boil at temperatures between about 100 and 400° F. In order to avoid complicating factors in the ordinary operation of the reactor, the solvent should be one which does not act as a poison to the polymerization reaction. Suitable solvents include a straight run naphtha, or kerosene, pentane, hexane, heptane, octane, isooctane, diisobutylene, triisobutylene, benzene, carbon tetrachloride and the like. Alcohols, esters, ketones and sulfur compounds are in general not suitable because of their tendency to poison Friedel-Crafts type catalysts.

The following example is illustrative of the present invention.

*Example 1*

A tubular type reactor such as described above having a holdup capacity of 8,000 pounds of liquid is supplied during normal operation with a feed of 10,000 pounds per hour of about 25 weight per cent of isobutylene in methyl chloride, the isobutylene containing 5 per cent of dimethylbutadiene (on the hydrocarbon). A catalyst solution of 0.25 weight per cent of aluminum chloride in methyl chloride is added at a rate of 800 pounds per hour. The reactor is supplied with refrigeration at a temperature such that the process liquid is maintained at a temperature below $-110°$ F. before excessive fouling has occurred. A slurry of 5 to 15 per cent rubber by weight is obtained in the reactor in normal operation. After a period of continuous operation, the reactor becomes fouled to the point where it is inadvisable to continue the production of polymer. At that time it may contain from 10 to 500 pounds of agglomerated polymer adhering to various portions of the inside surfaces.

The cycle operations pursued in putting the fouled reactor back on stream, clean is as follows:

| Time (Hours) | Operation |
|---|---|
| 0 | Catalyst addition is stopped. |
| 0 | Low temperature refrigeration is cut off from incoming feed and from reactor. Cleaning system prepared for operation. |
| 1½ | Feed cut off (reactor remains full). Hot (150° F.) cleaning solvent is slowly cut in to bottom reactor. (Rate of addition of solvent is limited by rate at which unreacted liquid can be vaporized in stripper and absorbed by recycle system.) Reactor agitator may be cut off during this period if desired. In this case, the recycle system is assumed capable of handling an increment of 4,000 pounds per hour of gas. |
| 3½ | Rate of solvent addition can now be increased to maximum of pump capacity (e. g. 50 to 200 g. p. m.) and reactor agitator should be running at this point. |
| 4½ | Circulation of hot polymer-contaminated solvent is discontinued and the reactor drained to the used solvent work tank. The agitator is turned off when drained. |
| 5 | The reactor is charged with hot clean solvent. The agitator is turned on. Clean solvent may be circulated through the stripper if desired, or merely circulated within the reactor. |
| 5½ | The clean wash solvent is dumped to the work tank for the first step of next cleaning cycle. |
| 6 | The reactor is filled with fresh cooled feed, and refrigeration is again supplied to the reactor. Feed is allowed to run through the reactor as soon as it is full. |
| 8 | Catalyst is cut in to the cold reactor, with feed running through it at full rate. |

It is advantageous to operate the reactor in such a manner that it is not kept on stream or producing polymer until the reactor becomes plugged. Accordingly, it is preferred to operate the reactor on a fixed cycle of approximately 24–60 hours with the reactor on stream for approximately 16–52 hours and then off stream for approximately eight hours during which cleansing of the reactor is effected.

Paraffinic hydrocarbon mixtures having a boiling point of about 300–400° F. are preferred solvents especially when used at temperatures of about 100–140° F. It is possible, however, to effect the cleansing of the reactor at temperatures only slightly above reaction temperatures using solvents such as n-pentane thereby substantially reducing the load upon the refrigeration system.

The foregoing description contains a limited number of embodiments of the present invention. It will be understood, however, that such embodiments are intended only to be illustrative since numerous variations are possible without departing from the purview of this invention as defined in the following claims.

What I claim and desire to secure by Letters Patent is:

1. In a continuous process for the manufacture of solid polymers which comprises a polymerization cycle of 16 to 52 hours wherein an isoolefin of from 4 to 8 carbon atoms per molecule, a diluent and a solution of a Friedel-Crafts catalyst dissolved in a solvent which does not freeze at reaction temperature and which does not form a complex with the catalyst are continuously supplied to a reactor which is substantially filled thereby while maintaining the contents of the reactor at a temperature below −40° C. by continuously supplying a suitable refrigerant in indirect heat exchange relation to the reactants, and continuously withdrawing a slurry of solid polymer particles in cold reaction liquid from the reactor, the improvement comprising the steps of stopping the addition of catalyst solution to the reactor when the surfaces of the reactor become fouled with polymer, cutting off the supply of refrigerant, cutting off the supply of fresh feed to the reactor, introducing a suitable solvent for the polymer in heated condition into the reactor substantially filled with residual reaction mixture and thereby displacing the residual reaction mixture, circulating the heated solvent in the reactor until the polymer fouling the surfaces of the reactor is dissolved, withdrawing the polymer-containing solvent from the reactor, flushing the reactor with fresh solvent, and resuming the supply of reactants, diluent and refrigerant to the reactor and thereafter resuming the supply of catalyst when the reactor contents are cooled to the reaction temperature whereby the polymerization cycle is re-commenced.

2. In a continuous process for the manufacture of solid polymers which comprises a plurality of polymerization cycles of 16 to 52 hours wherein a feed mixture of 50 to 99 weight percent of isobutylene and 50 to 1 weight percent of a copolymerizable diolefin, a diluent and a solution of a Friedel-Crafts catalyst dissolved in a solvent which does not freeze at reaction temperature and which does not form a complex with the catalyst are continuously supplied to a reaction zone which is substantially filled thereby while maintaining the contents of the reaction zone at a temperature between −40° F. and −153.4° F. by continuously supplying a suitable refrigerant in indirect heat exchange relation to the reactants and continuously withdrawing through an overflow a slurry of solid polymer particles in cool reaction liquid from the reaction zone to a polymer recovery zone where volatile materials are separated from the polymer, the improvement which consists of the steps of stopping the addition of catalyst solution to the reaction zone at the end of each polymerization cycle when the surfaces of said zone become fouled with polymer, cutting off the supply of refrigerant, continuing the supply of fresh feed until the residual slurry of polymer particles in reaction liquid is displaced from the reaction zone through an overflow to the polymer recovery zone, thereafter cutting off the supply of fresh feed and gradually introducing a suitable solvent for the polymer at 100 to 150° F. into the reaction zone, circulating the heated solvent in the reaction zone until the polymer fouling the surfaces of the reaction zone is dissolved, withdrawing the resulting solution of polymer from the reaction zone, flushing the reaction zone with fresh solvent, and resuming the supply of reactants, diluent and refrigerant to the reaction zone, and thereafter resuming the supply of catalyst solution when the contents of the reaction are cooled to the reaction temperature whereby the next polymerization cycle is re-commenced.

3. The process according to claim 2 wherein the diolefin is isoprene, the diluent and catalyst solvent is an alkyl chloride having less than 3 carbon atoms per molecule and the catalyst is aluminum chloride.

4. The process according to claim 2 wherein the diolefin is butadiene.

5. The process according to claim 2 wherein the diolefin is isoprene, and the polymerization diluent is methyl chloride and the polymer solvent is a paraffinic hydrocarbon boiling between 100 and 400° F.

6. The process according to claim 2 wherein the polymer solvent is straight-run naphtha having a boiling point of about 300 to 400° F.

7. In a continuous process for the manufacture of solid polymers which comprises a plurality of polymerization cycles of 16 to 52 hours wherein a feed mixture of 50 to 99 weight percent of isobutylene and 50 to 1 weight percent of a copolymerizable diolefin, an alkyl chloride diluent having less than 3 carbon atoms per molecule and a solution of aluminum chloride catalyst dissolved in an alkyl chloride solvent having less than 3 carbon atoms per molecule are continuously supplied to a reaction zone which is substantially filled thereby while maintaining the contents of the reaction zone at a temperature between −40° F. and −153.4° F. by continuously supplying a suitable refrigerant in indirect heat exchange relation to the reactants and continuously withdrawing through an overflow a slurry of solid polymer particles in cool reaction liquid from the reaction zone to a polymer recovery zone where volatile materials are separated from the polymer, the improvement which consists of the steps of stopping the addition of catalyst solution to the reaction zone at the end of each polymerization cycle when the surfaces of said zone become fouled with polymer, cutting off the supply of refrigerant, cutting off the supply of fresh feed and gradually introducing a suitable liquid paraffin hydrocarbon solvent at a temperature above reaction temperature and below 150° F. into the reaction zone in order to dissolve the polymer off the reaction zone surfaces, circulating the polymer solvent in the reaction zone until the polymer fouling the surfaces of the reaction zone is dissolved, withdrawing the resulting solution of polymer from the reaction zone, and resuming the supply of reactants, diluent and refrigerant to the reaction zone, and resuming the supply of catalyst solution to the reaction zone whereby the next polymerization cycle is recommenced.

8. A process according to claim 7 wherein the polymer solvent is n-pentane.

JOHN H. BANNON.

REFERENCES CITED

The following references are of record in the file of this patent:

UNITED STATES PATENTS

| Number | Name | Date |
|---|---|---|
| 2,085,524 | De Simo et al. | June 29, 1937 |
| 2,374,272 | Carpenter et al. | Apr. 24, 1945 |